(12) United States Patent
Baron et al.

(10) Patent No.: US 8,197,602 B2
(45) Date of Patent: Jun. 12, 2012

(54) ULTRASONIC JET-PUMP CLEANER

(76) Inventors: Michael J. Baron, New Lenox, IL (US);
Robert D. Geier, Woodridge, IL (US);
David Jonathan Gross, Bethesda, MD
(US); David Arguelles, Herndon, VA
(US)

( * ) Notice: Subject to any disclaimer, the term of this patent is extended or adjusted under 35 U.S.C. 154(b) by 519 days.

(21) Appl. No.: 12/356,954

(22) Filed: Jan. 21, 2009

(65) Prior Publication Data
US 2009/0223537 A1 Sep. 10, 2009

Related U.S. Application Data

(60) Provisional application No. 61/022,162, filed on Jan. 18, 2008.

(51) Int. Cl.
*B08B 3/12* (2006.01)
*B08B 9/00* (2006.01)
*B08B 9/04* (2006.01)
(52) U.S. Cl. ........... 134/1; 134/22.1; 134/22.18; 134/24
(58) Field of Classification Search .................. None
See application file for complete search history.

(56) References Cited

U.S. PATENT DOCUMENTS

| | | | | |
|---|---|---|---|---|
| 4,817,230 A * | 4/1989 | Kiyooka | ................... | 15/330 |
| 5,361,286 A | 11/1994 | Monserud et al. | | |
| 5,418,824 A | 5/1995 | Monserud et al. | | |
| 5,722,397 A * | 3/1998 | Eppstein | ................... | 600/345 |
| 6,572,709 B1 * | 6/2003 | Kaneda et al. | ................... | 134/1 |
| 6,622,941 B2 | 9/2003 | Ganoza et al. | | |
| 6,633,623 B2 * | 10/2003 | Dulka et al. | ................... | 376/306 |
| 2003/0062071 A1* | 4/2003 | Sorbo et al. | ................... | 134/184 |
| 2004/0020003 A1* | 2/2004 | Strauser | ................... | 15/340.3 |
| 2005/0045747 A1* | 3/2005 | Hacquebord | ................... | 239/525 |

OTHER PUBLICATIONS

International Search Report and Written Opinion for PCT Application No. PCT/US09/50975 date mailed Jan. 13, 2010.

* cited by examiner

*Primary Examiner* — Michael Kornakov
*Assistant Examiner* — Nicole Blan
(74) *Attorney, Agent, or Firm* — Pillsbury Winthrop Shaw Pittman LLP (57) ABSTRACT

A method of in-situ cleaning of a portion of a boiling water reactor nuclear power plant. In one aspect, the method includes identifying a jet pump for the boiling water reactor nuclear power plant for cleaning, providing an ultrasonic cleaning tool that has a transducer, inserting at least a portion of the transducer into or adjacent to the interior cavity of the jet pump, in-situ, and energizing the transducer to a desired energy level.

28 Claims, 12 Drawing Sheets

ULTRASONIC JET-PUMP CLEANER

This application claims the benefit of the filing date of U.S. provisional application Ser. No. 61/022,162 entitled "ULTRASONIC JET PUMP CLEANER," which was filed on Jan. 18, 2008 and which is herein incorporated by reference.

FIELD OF THE INVENTION

This invention relates to method of cleaning a jet pump for a boiling water reactor nuclear power plant. Specifically, it relates to an ultrasonic method of cleaning a jet pump for a boiling water reactor nuclear power plant.

BACKGROUND OF THE INVENTION

Jet pump fouling is a problem common to many boiling water reactor (BWR) nuclear power plants. Accumulation of deposits in BWR jet pumps reduces the effectiveness of the jet pumps and can result in reduced reactor core performance (and reduced or less efficient power generation). Removal of deposits from fouled jet pumps through hydrolazing has been shown to improve the flow characteristics of the pumps. In typical practice, hydrolaze cleaning requires removal of the jet pumps from the reactor vessel in order to access all of the areas where deposits form. A cleaning system capable of removing deposits from the jet pumps in-situ would reduce the maintenance costs by reducing or eliminating the need to remove the jet pump assemblies from the reactor vessel and would reduce the performance degradation associated with jet pump fouling in BWRs.

SUMMARY

A method of in-situ cleaning of a portion of a boiling water reactor nuclear power plant is presented. In one aspect, the method comprises identifying a jet pump for the boiling water reactor nuclear power plant for cleaning, providing an ultrasonic cleaning tool that has at least one transducer, inserting at least a portion of the transducer into the interior cavity of the jet pump in-situ, and energizing the transducer to a desired energy level.

In one aspect, a single transducer is energized to an energy level from about 500 watts to about 1500 watts. In another aspect, the transducer can be energized to an energy level between about 750 watts and about 1200 watts.

Additionally, in one exemplary aspect, the transducer may be operated at a frequency from about 20 kHz to about 40 kHz. It may, for instance, be operated at a frequency of about 25 kHz.

One of the advantages of using ultrasonic cleaning versus water jet cleaning or hydrolazing is that hydrolazing tends to remove material in large flakes which have the potential to become foreign material that can damage fuel and/or reactor components, while the ultrasonic method results in removal of material in fine particulate form. Optionally, in one aspect, the ultrasonic cleaning tool comprises at least one suction port operatively connected to a suction hose. In this aspect, local filtration in the suction port may be provided in order to remove and capture the liberated deposits, and to provide a clean volume of water around the transducer for the purpose of efficient transmission of ultrasonic energy.

In another embodiment of the method of in-situ cleaning a portion of a boiling water reactor nuclear power plant, the method comprises identifying the jet pump, providing a plurality of ultrasonic transducers, positioning at least a portion of each of the transducers substantially adjacent a portion of the jet pump in-situ, and energizing the transducers to a desired energy level.

DETAILED DESCRIPTION OF THE FIGURES

These and other features of the preferred embodiments of the invention will become more apparent in the detailed description in which reference is made to the appended drawings wherein.

DETAILED DESCRIPTION OF THE INVENTION

The present invention can be understood more readily by reference to the following detailed description, examples, drawing, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a transducer" can include two or more such transducers unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

A method of in-situ cleaning of a portion of a boiling water reactor nuclear power plant is presented. In one aspect, the method comprises first identifying a jet pump 10 for the boiling water reactor nuclear power plant for cleaning. As one skilled in the art can appreciate, the jet pump defines an interior cavity 100. The method also comprises providing an ultrasonic cleaning tool 200 that has a transducer 300, inserting at least a portion of the transducer into the interior cavity 100 of the jet pump 10 in-situ, and energizing the transducer 300 to a desired energy level. In one exemplary aspect, the method may also comprise translating at least a portion of the transducer about a portion of the interior cavity of the jet pump.

In the interior cavity of a jet pump, the ultrasonic transducers may have to operate at two to three atmospheres of overpressure. The overpressure can suppress cavitation caused by the ultrasonic transducer at normal transducer amplitudes. Since cavitation is what causes the breakup of deposits on the surfaces of the jet pump 10, it is important to have sufficient transducer amplitude to induce cavitation. Operation of the transducer at increased amplitude under normal atmospheric pressure conditions has the potential to cause the transducer to decouple from the fluid and cause damage to the transducer. It has been found by experimentation that an increase in transducer power of roughly 40% was sufficient to compensate for the effects of 2 to 3 atmospheres of overpressure such that adequate cavitation for cleaning was induced and decoupling of the radiating face did not occur. It is important to note that an increase of this magnitude under normal atmospheric conditions may cause damage to the transducer itself. Therefore, specially designed transducers are necessary for this application.

Additionally, in one exemplary aspect, the transducer 300 may be operated at a frequency from about 20 kHz to about 40 kHz. It may, for instance, be operated at a frequency of about 25 kHz. It is contemplated that higher frequencies may be used; however, cleaning effectiveness generally goes down as the frequency goes up. Additionally, a multi-frequency setup could be used, that either varies the frequency with time or includes multiple discrete frequencies operating simultaneously or in sequence.

As is known in the art, the jet pump 10 comprises a mixer stage 110, as well as a diffuser stage 120. In one aspect of the invention, at least a portion of the transducer is translated within the interior cavity, about a portion of the mixer stage and/or the diffuser stage. Generally, for these stages of the jet pump, it is appropriate to use a radial omni-directional transducer with a diameter sufficiently small to be deployed through at least a portion of at least one of the inlets of the jet pump. In one non-limiting example, the transducer comprises a diameter of 1.5 inches or less.

Figure 12:
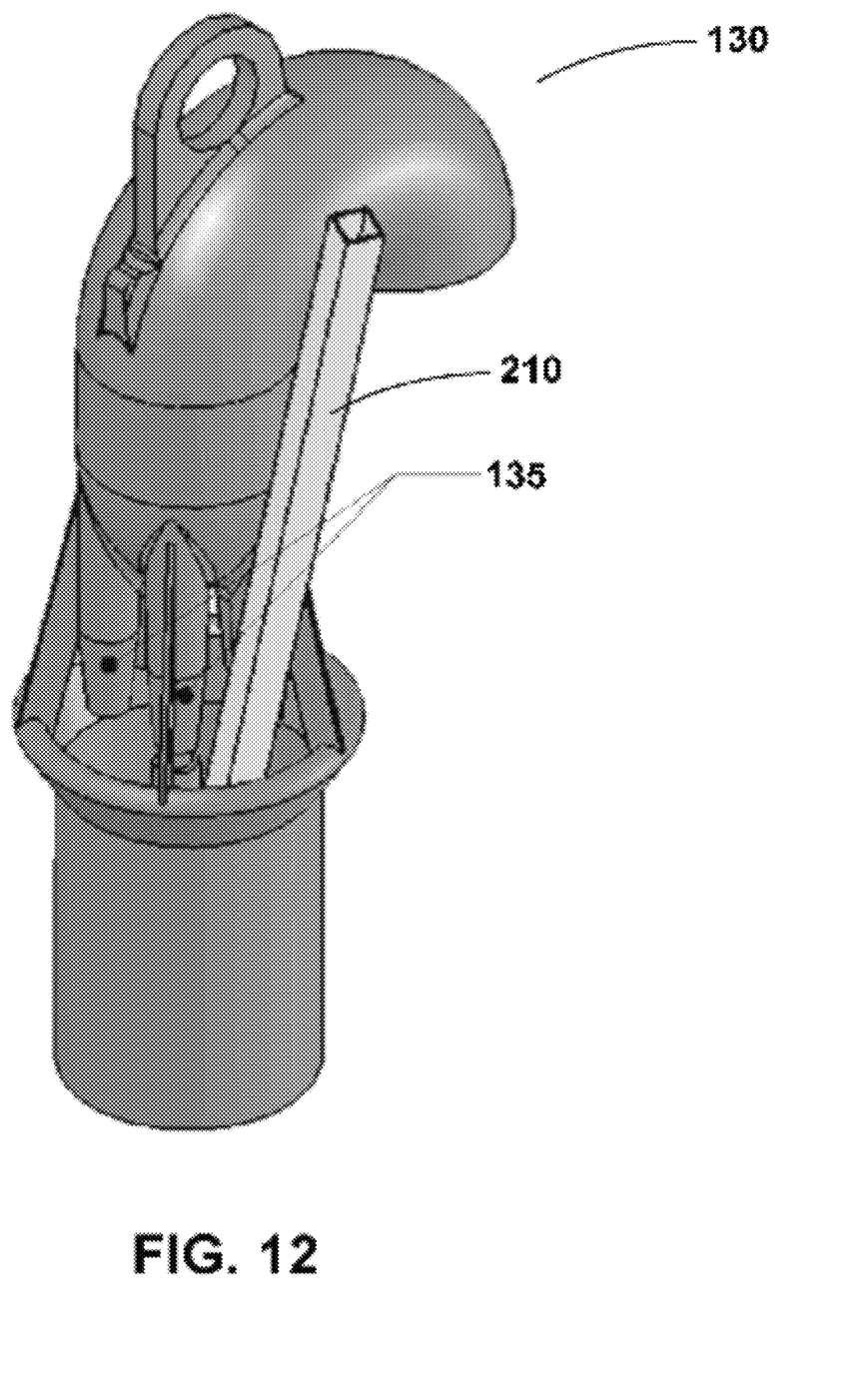
FIG. 12 is a perspective of a nozzle portion of a jet pump of a boiling water reactor nuclear power plant, showing one embodiment of a delivery boom for deploying a transducer inside a portion of the jet pump nozzle.
Figure 13:
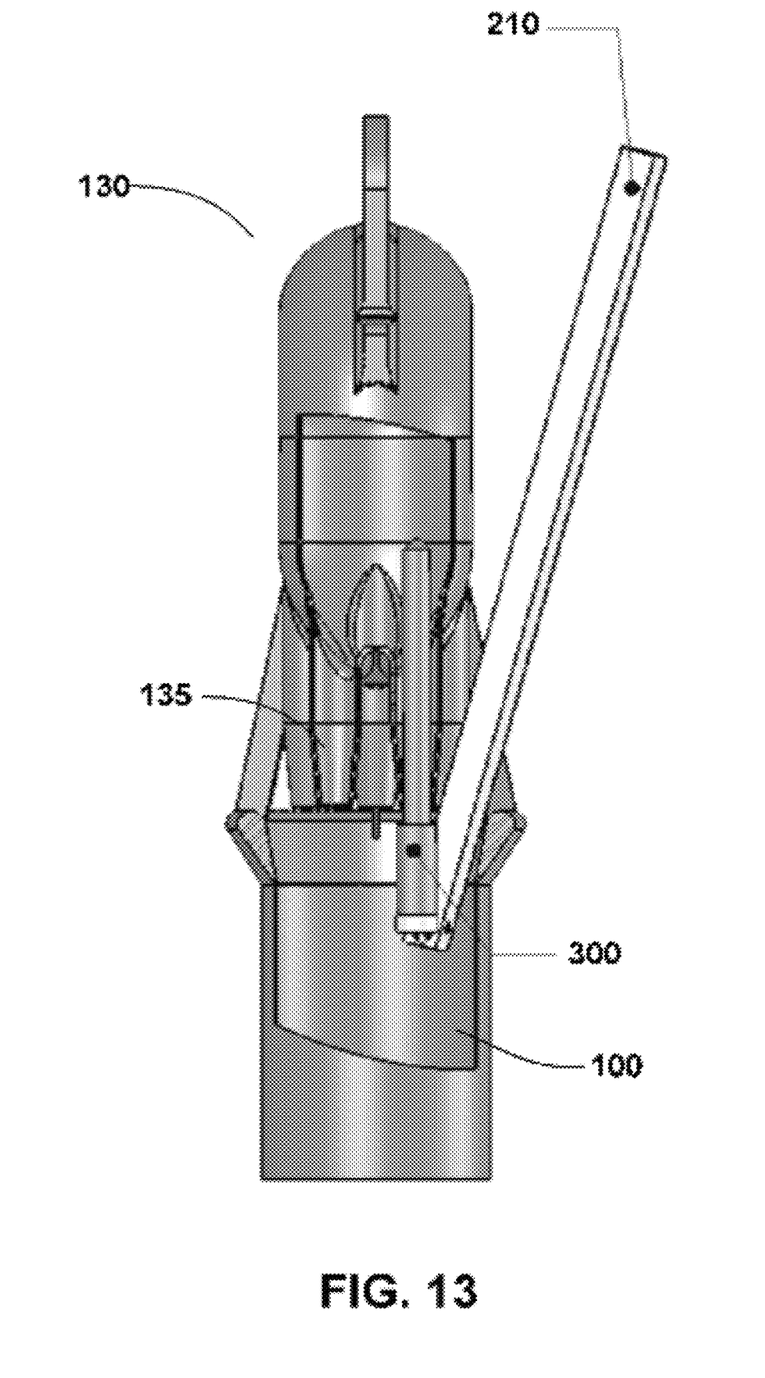
FIG. 13 is a side elevational view of the nozzle portion of FIG. 12.
Figure 14:
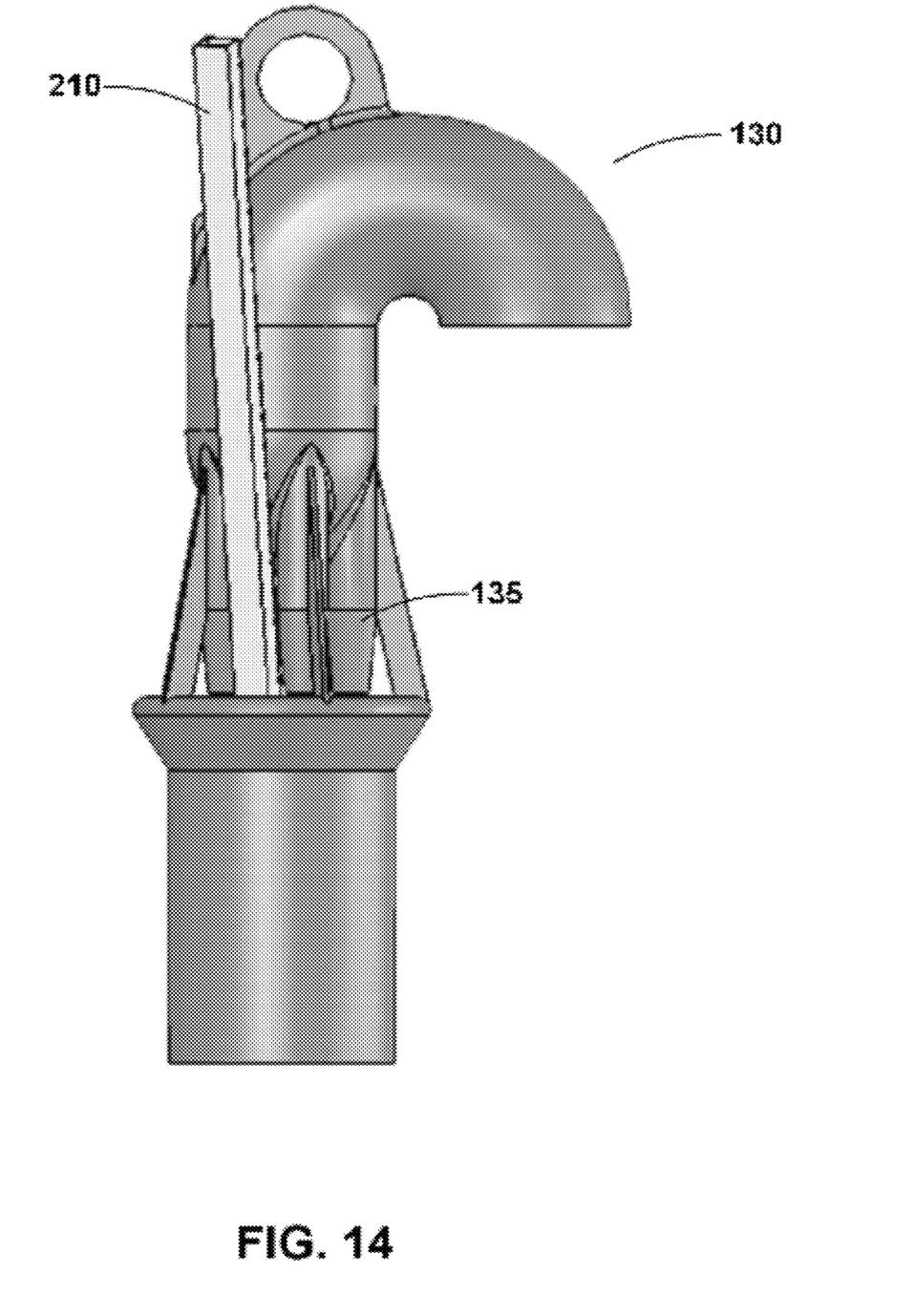
FIG. 14 is a front elevational view of the nozzle portion of FIG. 12.

In the nozzle portion 130 of the jet pump, it is more difficult to deploy the transducer. In one aspect, the method of cleaning the jet pump also comprises providing a pole or delivery boom 210. The delivery boom may, for example, have a telescoping aspect. The boom 210 may be operatively connected to the transducer 300, which is deployed into a portion of the nozzle, as is illustrated in FIGS. 12-14.

Figure 1:
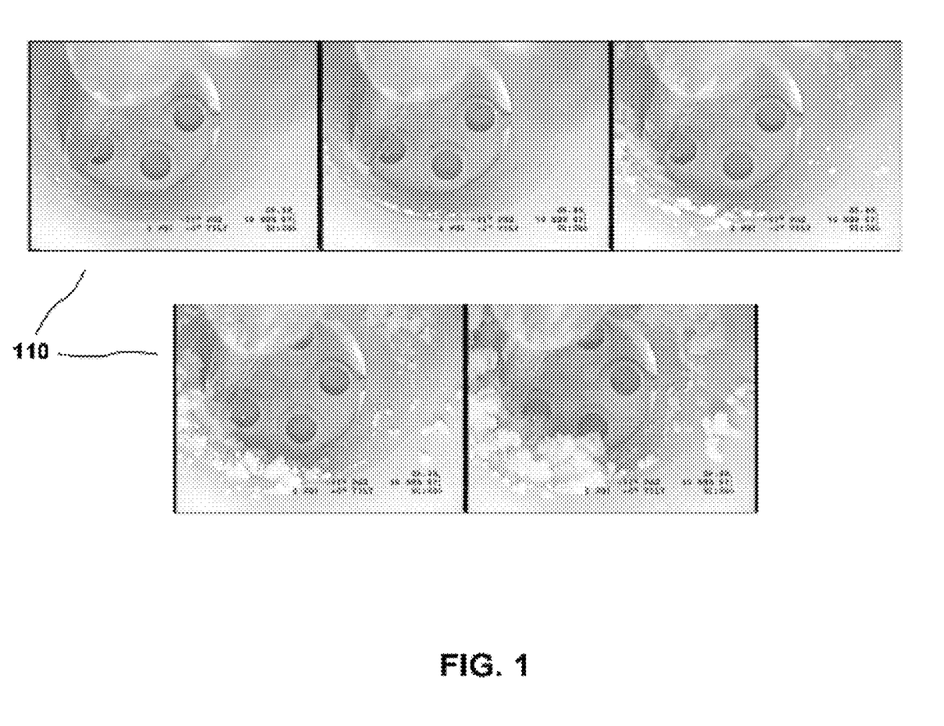
FIG. 1 is a sequential series of photographs of the inner diameter of the mixer stage of a jet pump of a boiling water reactor nuclear power plant, taken during an ultrasonic cleaning test of a fouled jet pump, spanning the first 1.0 seconds of cleaning.
Figure 2A:
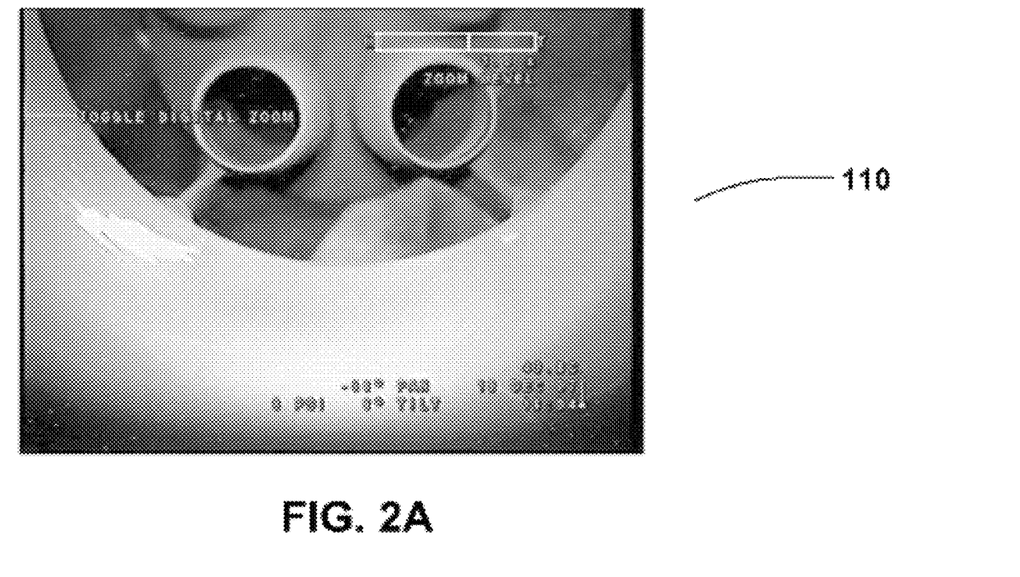
FIG. 2A is a photograph of the inner diameter of the mixer stage of FIG. 1, showing the mixer stage covered by a fairly uniform layer of deposits prior to cleaning of the fouled jet pump.
Figure 2B:
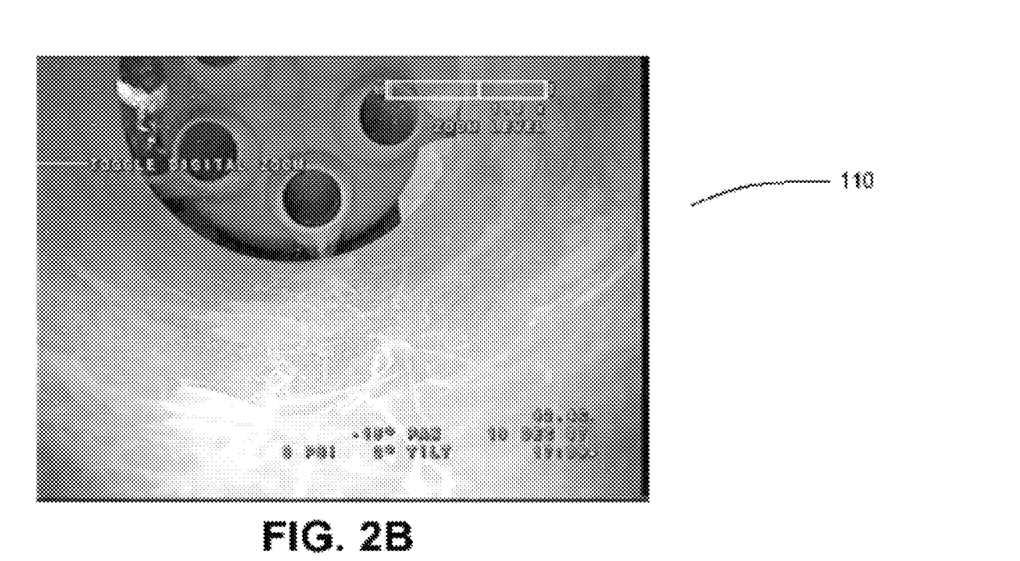
FIG. 2B is a photograph of the inner diameter of the mixer stage of FIG. 1, showing the mixer stage subsequent to the cleaning of the fouled jet pump and illustrating that a significant fraction of the deposits present in FIG. 2A have been removed by the ultrasonic cleaning process.
Figure 3:
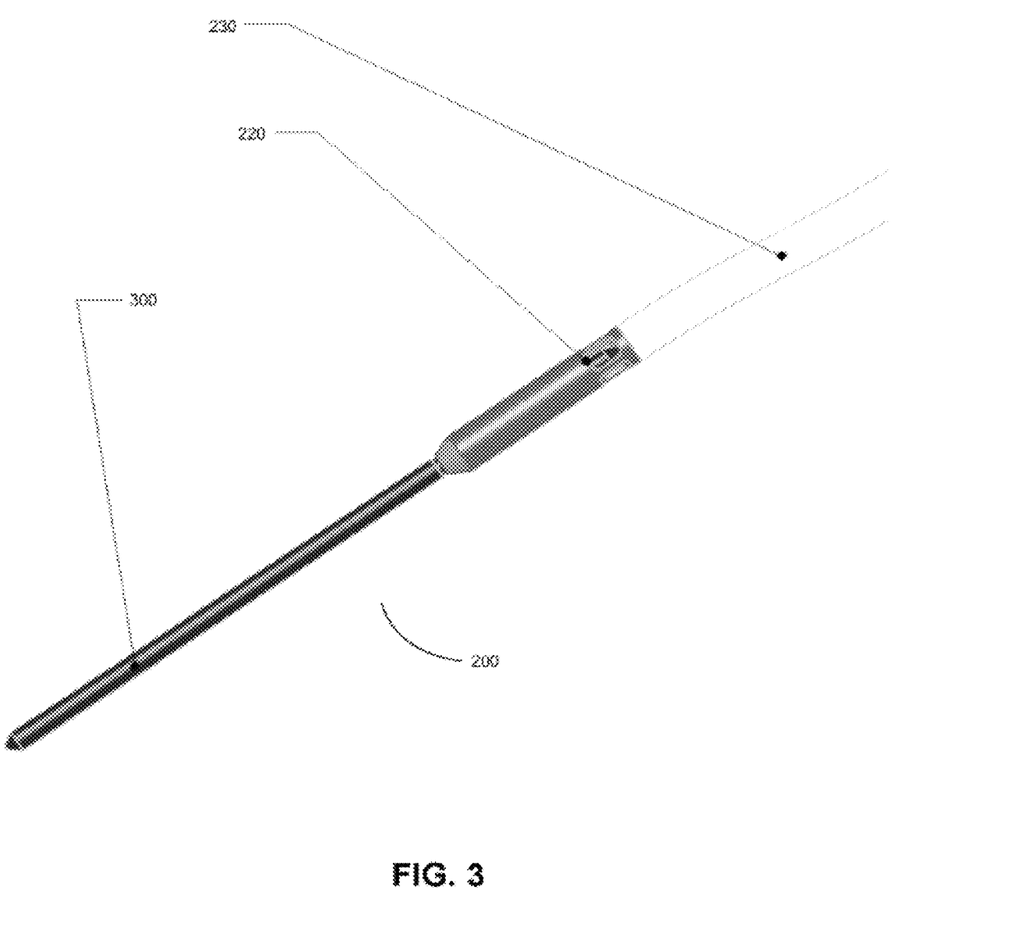
FIG. 3 is a perspective view of one embodiment of a radial omni-directional transducer for use in cleaning the mixer region of the jet pump, showing suction ports on the delivery tool and a suction hose for collection of liberated deposits.
Figure 4:
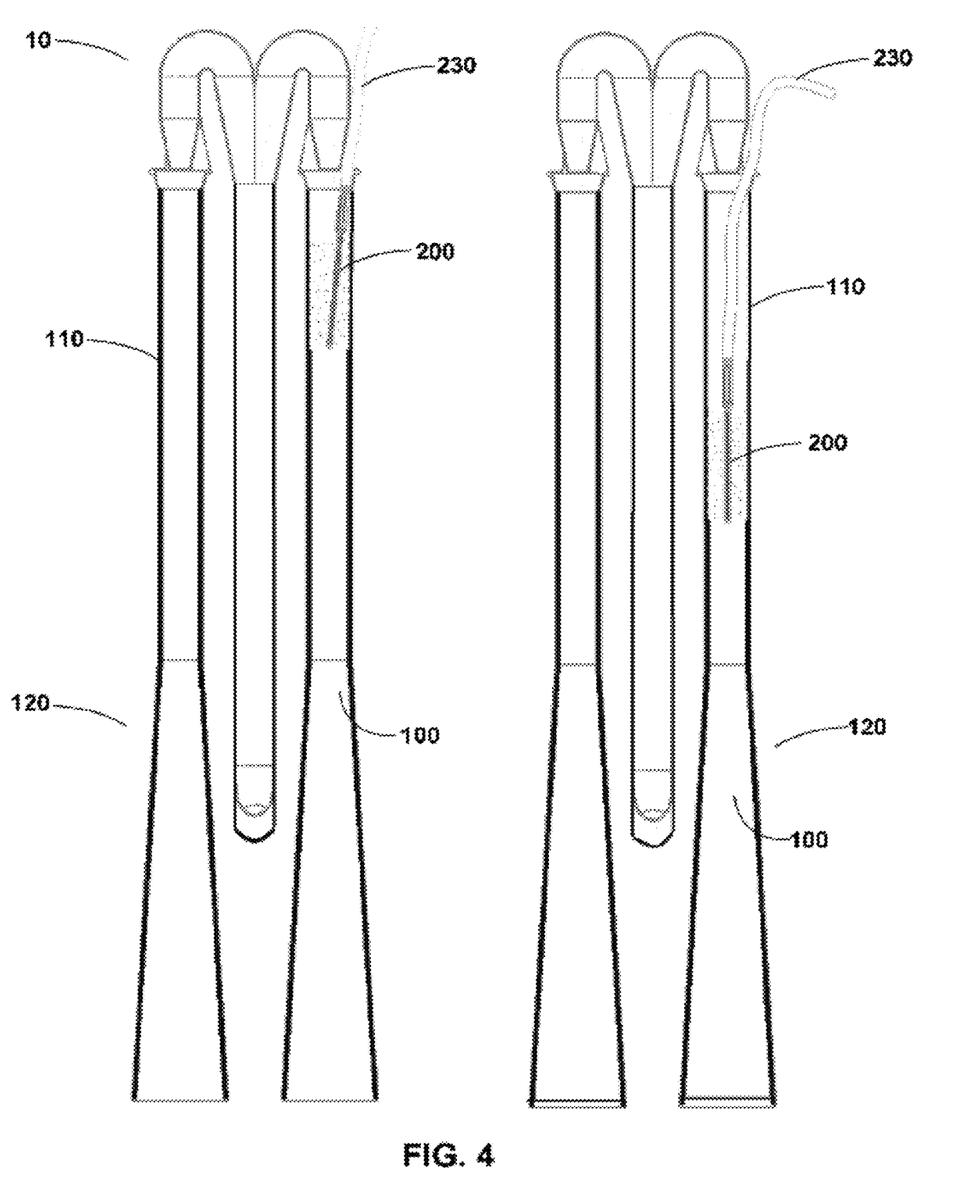
FIG. 4 is a front side elevational view of a mixer stage and diffuser stage of a jet pump of a boiling water reactor nuclear power plant, showing one aspect of the radial omni-directional transducer of FIG. 3 deployed into the interior cavity of the jet pump.

One of the advantages of using ultrasonic cleaning versus water jet cleaning or hydrolazing is that hydrolazing tends to remove material in large flakes which have the potential to become foreign material that can damage fuel and/or reactor components, while the ultrasonic method results in a removal of material in fine particulate form. Thus, in a further aspect, the ultrasonic cleaning tool 200 can optionally comprise at least one suction port 220 that is operatively connected to a suction hose 230. In this aspect, local filtration in the suction port 220 may be provided in order to remove and capture the liberated deposits, and to provide a clean volume of water around the transducer for the purpose of efficient transmission of ultrasonic energy. To assist in cleaning, the method may also comprise blocking a portion of the interior cavity of the jet pump to facilitate improved capture of particulate via the suction port.

In another embodiment of the method of in-situ cleaning a portion of a boiling water reactor nuclear power plant, the method comprises identifying the jet pump, providing at least one, but preferably a plurality of ultrasonic transducers, positioning at least a portion of each of the transducers substantially adjacent to a portion of the jet pump in-situ, and energizing the transducers to a desired energy level.

The total power output of the transducer is dependent upon the specific design of each cleaning tool and the amount of area to be cleaned at a time. As mentioned herein above, the transducers may be energized to an energy level is from about 500 watts when using a single transducer, to about 2500 watts where a plurality of transducers is present. In another aspect, the transducer(s) are energized to a level from about 750 watts to about 1500 watts. These ranges are generally acceptable for confined spaces, for example and not meant to be limiting. They may also be operated at a frequency from about 20 kHz to about 40 kHz, or more specifically, at a frequency of about 25 kHz. Again, it is contemplated that other energy levels and/or frequencies can be used in the device/methodologies described herein.

Figure 5:
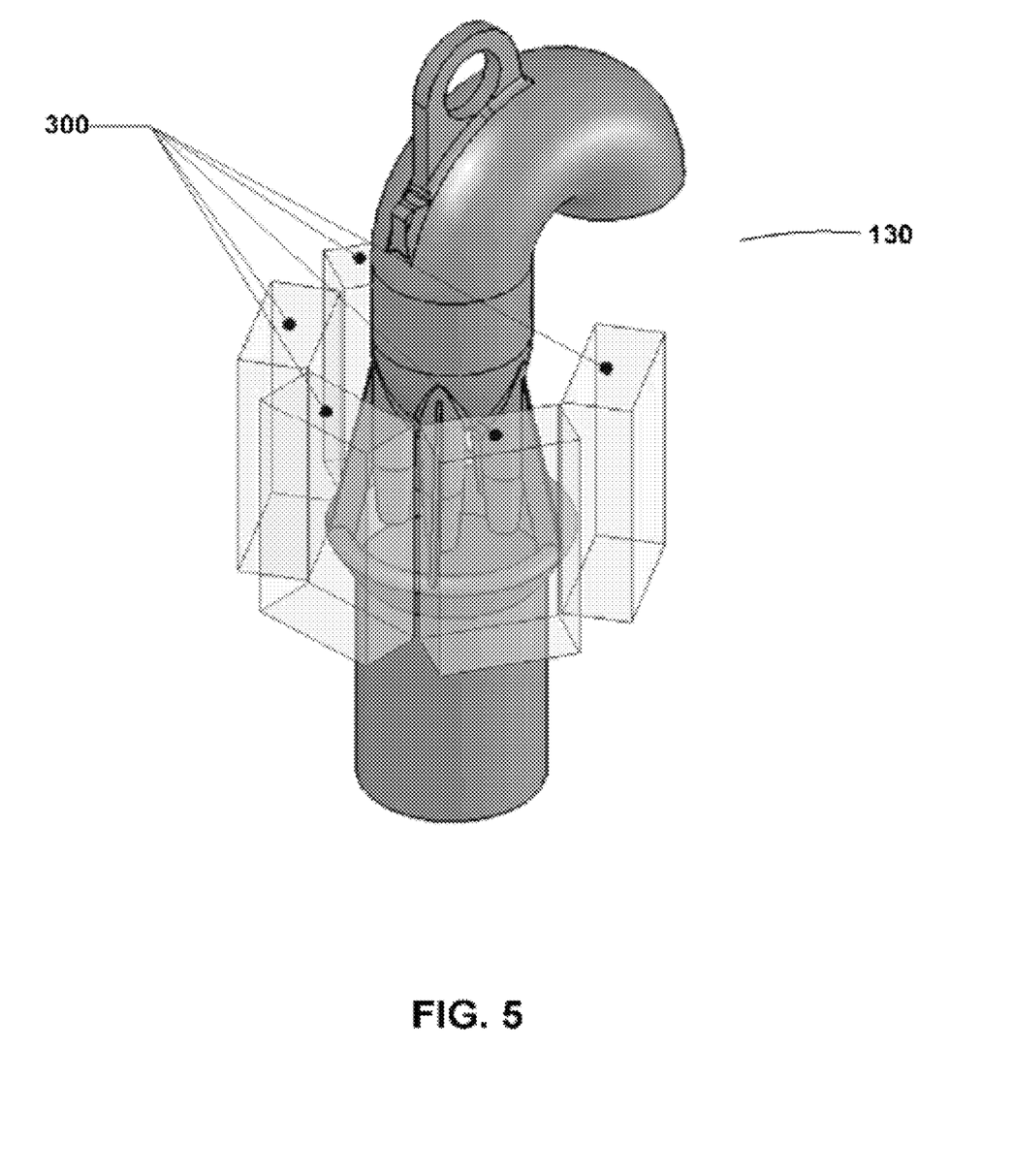
FIG. 5 is a perspective view of a nozzle portion of a jet pump of a boiling water reactor nuclear power plant, showing one embodiment for an array of planar type directional ultrasonic transducers arranged in a substantially side-by-side relationship circumferentially around the nozzle portion.
Figure 6:
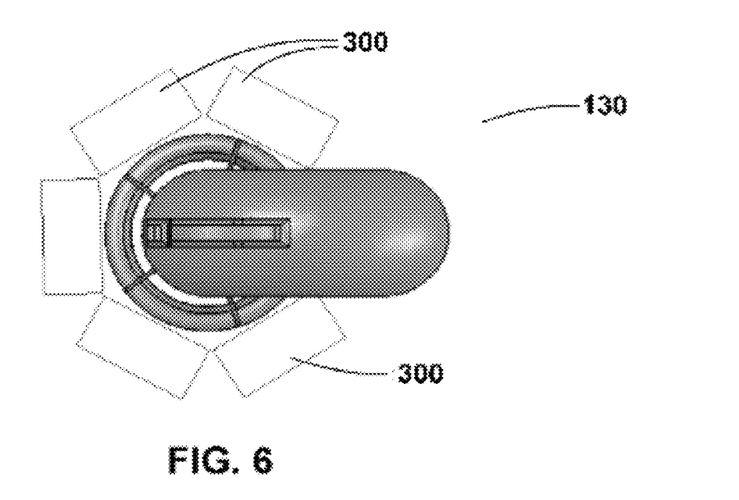
FIG. 6 is a top elevational view of the nozzle portion of FIG. 5.
Figure 7:
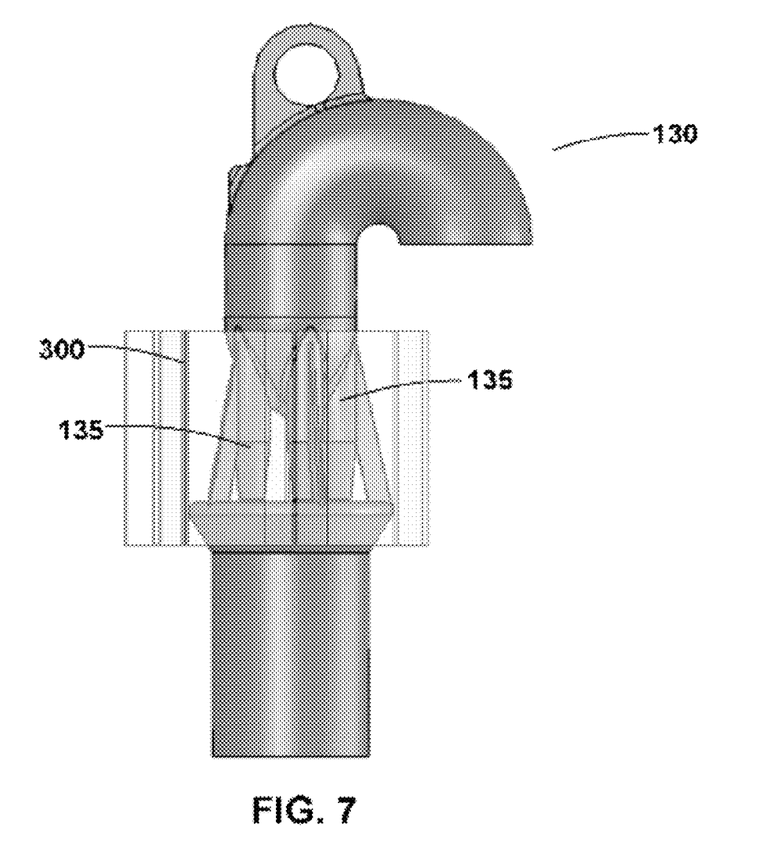
FIG. 7 is a front elevational view of the nozzle portion of FIG. 5.
Figure 8:
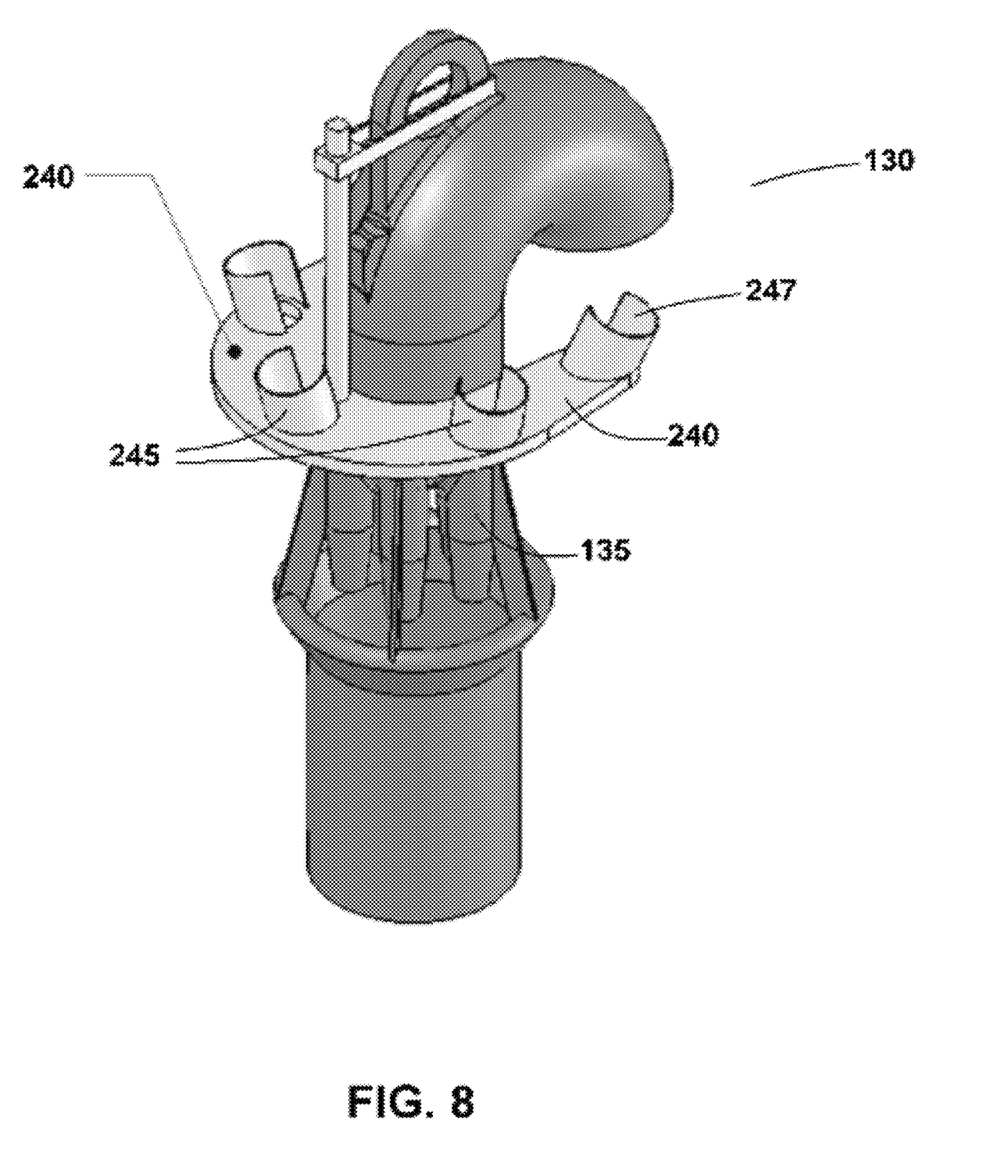
FIG. 8 is a perspective view of a nozzle portion of a jet pump of a boiling water reactor nuclear power plant, showing one embodiment of a transducer positioning fixture mounted to an exterior portion of the nozzle portion.
Figure 9:
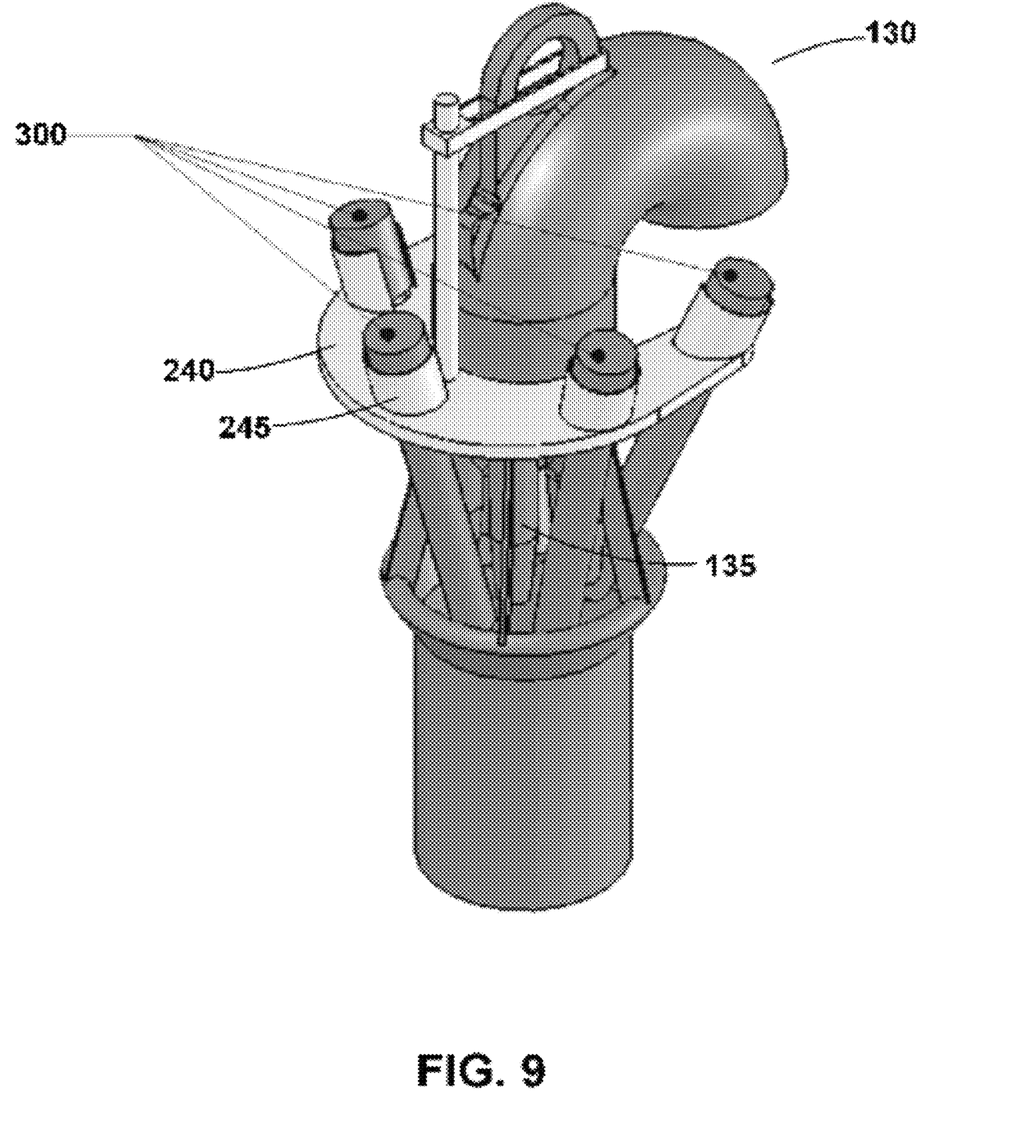
FIG. 9 is a perspective view of the nozzle portion of FIG. 8, showing a plurality of transducer holders configured to position each of at least a portion of the plurality of ultrasonic transducers substantially adjacent an external portion of the nozzle portion of the jet pump.
Figure 10:
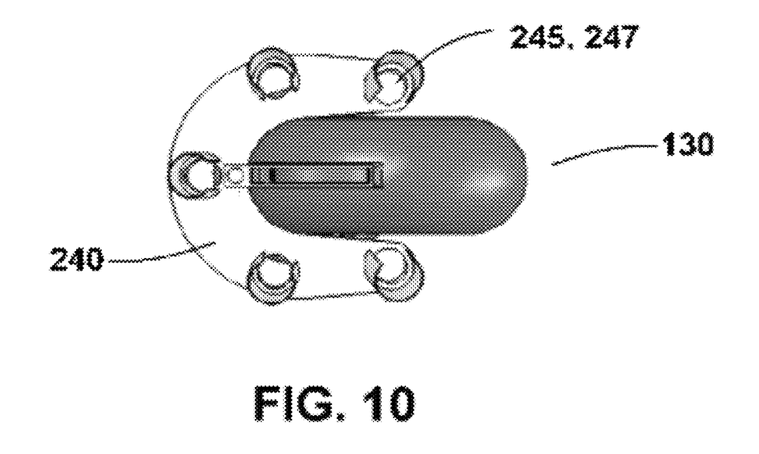
FIG. 10 is a top elevational view of the nozzle portion of FIG. 8.
Figure 11:
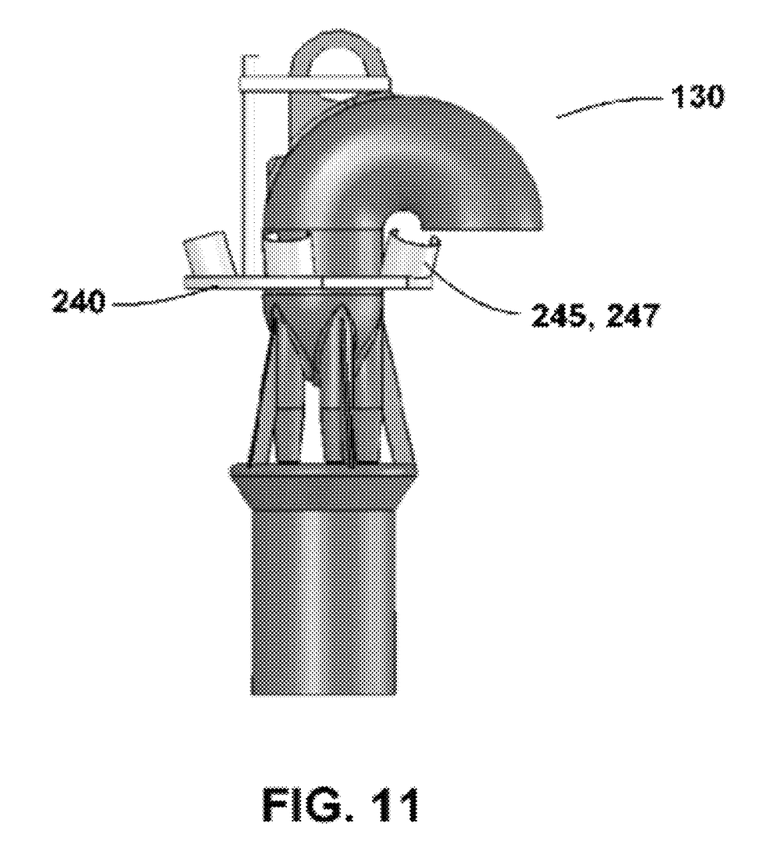
FIG. 11 is a front elevational view of the nozzle portion of FIG. 8.

In one aspect of this embodiment, the plurality of ultrasonic transducers 300 comprises an array of planar type directional ultrasonic transducers arranged in a substantially side-by-side relationship circumferentially around the nozzle portion 130 of the jet pump. This is illustrated in FIGS. 5-7. In this aspect, the transducers may remain external to the jet pump, whereby ultrasonic energy passes through the jet pump structure. It is contemplated that a portion of at least some of the transducers may also be internal to the nozzle portion of the jet pump.

In this aspect, the array of transducers may be energized to an energy level from about 1000 watts to about 6000 watts, or more specifically, from about 2500 watts to about 4000 watts. These ranges are generally acceptable for either large spaces or obstructed areas, such as cleaning through the walls of the jet pump, for example and not meant to be limiting.

In another aspect, the method may comprise the step of adjusting the energy level of the transducer(s) to a desired energy level so as to compensate for the amount of overpressure present in the jet pump. As mentioned herein above, the transducer should be energized to a level sufficient to induce cavitation, yet not to a level high enough to cause decoupling of the fluid from the transducer. For example, and not meant to be limiting, for 2-3 atmospheres of overpressure, the energy level required may be 30%-50% greater than that required at normal atmospheric pressure.

In yet another aspect, the method also comprises providing a transducer positioning fixture 240 configured to position each of at least a portion of the plurality of ultrasonic transducers 300 substantially adjacent a portion of the nozzle portion of the jet pump. The positioning fixture 240 comprises a plurality of transducer holders 245, as illustrated in FIGS. 8-11. The transducer holders 245 may have, for example, sleeves 247 configured to hold the transducers substantially adjacent the nozzles 135. Optionally, the method can further comprise mounting the positioning fixture to an exterior portion of the nozzle portion of the jet pump. Additionally, in one exemplary aspect, the method can comprise a positioning fixture comprising a plurality of transducers as an integral unit. In this aspect, the positioning fixture is installed substantially adjacent the nozzles as a single unit.

In still another aspect, the nozzle portion of the jet pump may comprise a plurality of nozzles. In this aspect, the plurality of transducers, whether integrally situated in a positioning fixture or individually positioned within one of the plurality of transducer holders, may be installed substantially adjacent to a portion of the plurality of nozzles.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

We claim:

1. A method of in-situ cleaning of a portion of a boiling water reactor nuclear power plant, the method comprising: identifying a jet pump for the boiling water reactor nuclear power plant, the jet pump defining an interior cavity comprising a fluid; providing an ultrasonic cleaning tool comprising at least one transducer; inserting at least a portion of the at least one transducer into the interior cavity of the jet pump in-situ; determining the desired energy level of the at least one transducer sufficient to compensate for overpressure and induce cavitation; and energizing the at least one transducer to the desired energy level.

2. The method of claim 1, further comprising translating at least a portion of the at least one transducer about a portion of the interior cavity of the jet pump.

3. The method of claim 2, wherein the jet pump has a mixer stage comprising a portion of the interior cavity of the jet pump, and wherein at least a portion of the at least one transducer is translated about a portion of the mixer stage portion of the interior cavity.

4. The method of claim 1, wherein the desired energy level is between about 750 watts and about 1500 watts.

5. The method of claim 1, wherein the desired energy level is lower than that required to induce decoupling of the fluid from the at least one transducer.

6. The method of claim 1, wherein the at least one transducer is operated at a frequency from about 20 kHz to about 40 kHz.

7. The method of claim 1, wherein the at least one transducer is operated at a frequency of about 25 kHz.

8. The method of claim 1, wherein the jet pump has a diffuser stage comprising a portion of the interior cavity of the jet pump, and wherein at least a portion of the at least one transducer is translated about a portion of the diffuser stage portion of the interior cavity.

9. The method of claim 1, wherein the at least one transducer is a radial omni-directional transducer.

10. The method of claim 9, wherein the at least one transducer comprises a diameter of less than 1.5 inches.

11. The method of claim 9, wherein the jet pump comprises at least one inlet, and wherein the at least one transducer is deployed through at least a portion of the at least one inlet of the jet pump.

12. The method of claim 1, wherein the jet pump has a nozzle portion, wherein the interior cavity of the jet pump comprises the nozzle portion.

13. The method of claim 12, comprising: providing a delivery boom operatively connected to at least a portion of the ultrasonic transducer; and deploying the at least one transducer inside a portion of the nozzle portion of the jet pump via the delivery boom.

14. The method of claim 13, wherein the delivery boom comprises a telescoping delivery boom.

15. The method of claim 1, wherein the ultrasonic cleaning tool comprises at least one suction port operatively connected to a suction hose.

16. The method of claim 15, further comprising the step of blocking a portion of the interior cavity of the jet pump to facilitate improved capture of particulate via the suction port.

17. The method of claim 1, wherein:
said energizing of the at least one transducer to the desired energy level induces cavitation without inducing decoupling of the fluid from the transducer; and
the desired energy level is an energy level that would decouple the fluid from the at least one transducer under normal atmospheric pressure conditions.

18. A method of in-situ cleaning of a portion of a boiling water reactor nuclear power plant, the method comprising: identifying a jet pump for the boiling water reactor nuclear power plant, the jet pump comprising an interior cavity comprising fluid; providing a plurality of ultrasonic transducers; positioning at least a portion of each of the transducers substantially adjacent a portion of the jet pump in-situ; determining the desired energy level of the plurality of transducers sufficient to compensate for overpressure and induce cavitation; and energizing the plurality of transducers to the desired energy level.

19. The method of claim 18, wherein the desired energy level is from about 1000 watts to about 6000 watts.

20. The method of claim 19, wherein the desired energy level is from about 2500 watts to about 4000 watts.

21. The method of claim 18, wherein the desired energy level is lower than that required to induce decoupling of the fluid from the transducers.

22. The method of claim 18, wherein the transducers are operated at a frequency from about 20 kHz to about 40 kHz.

23. The method of claim 18, wherein the transducers are operated at a frequency of about 25 kHz.

24. The method of claim 18, wherein the portion of the jet pump comprises a nozzle portion.

25. The method of claim 24, wherein the plurality of ultrasonic transducers comprises an array of planar type directional ultrasonic transducers arranged in a substantially side-by-side relationship circumferentially around the nozzle portion of the jet pump.

26. The method of claim 24, wherein the nozzle portion of the jet pump comprises a plurality of nozzles.

27. The method of claim 24 further comprising: providing a transducer positioning fixture comprising a plurality of transducer holders configured to position each of at least a portion of the plurality of ultrasonic transducers substantially adjacent a portion of the nozzle portion of the jet pump; and mounting the positioning fixture to an exterior portion of the nozzle portion of the jet pump.

28. The method of claim 18, wherein:
said energizing of the plurality of transducers to the desired energy level induces cavitation without inducing decoupling of the fluid from the plurality of transducers; and
the desired energy level is an energy level that would decouple the fluid from the plurality of transducers under normal atmospheric pressure conditions.

* * * * *